United States Patent
Ooba (10) Patent No.: US 11,285,624 B2
(45) Date of Patent: Mar. 29, 2022

(54) OBJECT DETECTION DEVICE, CONTROL DEVICE, AND OBJECT DETECTION COMPUTER PROGRAM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 216 days.

(21) Appl. No.: 16/790,742

(22) Filed: Feb. 14, 2020

(65) Prior Publication Data

US 2020/0269448 A1    Aug. 27, 2020

(30) Foreign Application Priority Data

Feb. 22, 2019    (JP) .............................. JP2019-030506

(51) Int. Cl.
| | |
|---|---|
| *B25J 19/04* | (2006.01) |
| *B25J 19/02* | (2006.01) |
| *B25J 9/16* | (2006.01) |
| *B25J 9/10* | (2006.01) |

(52) U.S. Cl.
CPC ............... *B25J 19/04* (2013.01); *B25J 9/10* (2013.01); *B25J 9/1697* (2013.01); *B25J 19/023* (2013.01)

(58) Field of Classification Search
CPC ................. B25J 9/04; B25J 9/16; G06K 9/62
See application file for complete search history.

(56) References Cited

U.S. PATENT DOCUMENTS

| | | | | |
|---|---|---|---|---|
| 9,349,076 | B1* | 5/2016 | Liu | ................. G06K 9/00369 |
| 9,424,470 | B1* | 8/2016 | Hinterstoisser | ........ B25J 9/0093 |
| 10,542,959 | B2* | 1/2020 | Babic | .................. A61B 5/0035 |
| 2012/0128204 | A1* | 5/2012 | Aoba | .................. G06K 9/6228 |
| | | | | 382/103 |

(Continued)

FOREIGN PATENT DOCUMENTS

| | | |
|---|---|---|
| JP | 2005056300 A | 3/2005 |
| JP | 2009-83095 A | 4/2009 |
| JP | 2018-126799 A | 8/2018 |

(Continued)

OTHER PUBLICATIONS

Pei-Chi Huang et al., "A Case Study of Cyber-Physical System Design: Autonomous Pick-and-Place Robot", Aug. 28, 2018 IEEE 24th International Conference on Embedeed and Real-Time Computing Systems and Applications (RTCSA), U.S.A., pp. 22-31, https://ieeexplore.ieee.org/stamp/stamp.jsp?tp=&arnumber=8607230, 10pp.

(Continued)

*Primary Examiner* — Kira Nguyen
(74) *Attorney, Agent, or Firm* — Hauptman Ham, LLP (57) ABSTRACT

An object detection device detects, when a camera that generates an image representing a target object and the target object do not satisfy a predetermined positional relationship, a position of the target object on the image by inputting the image to a classifier, and detects, when the camera and the target object satisfy the predetermined positional relationship, a position of the target object on the image by comparing, with the image, a template representing a feature of an appearance of the target object when the target object is viewed from a predetermined direction.

9 Claims, 7 Drawing Sheets

(56) References Cited

U.S. PATENT DOCUMENTS

2018/0260628 A1* 9/2018 Namiki .................. G06N 3/088
2018/0281197 A1* 10/2018 Shiraishi ................ B25J 9/1669

FOREIGN PATENT DOCUMENTS

| JP | 6376296 B1 | 8/2018 |
|---|---|---|
| JP | 2018-158439 A | 10/2018 |
| JP | 2018-205929 A | 12/2018 |
| WO | 2018146769 A1 | 8/2018 |

OTHER PUBLICATIONS

Masayuki Obata et al., "Development of Outdoor Service Robot to Collect Trash on Streets", Jul. 1, 2006, The transactions of the Institute of Electrical Engineers of Japan. C, Japan, The Institute of Electrical Engineers of Japan, vol. 126 No. 7, p. 840-848, 9pp.
Bugra Tekin et al., Real-Time Seamless Single Shot 6D Object Pose Prediction, Dec. 7, 2018, arXiv:1711.08848v5; 16 pages.

\* cited by examiner

OBJECT DETECTION DEVICE, CONTROL DEVICE, AND OBJECT DETECTION COMPUTER PROGRAM

RELATED APPLICATIONS

The present application claims priority to Japanese Application Number 2019-030506, filed Feb. 22, 2019, the disclosure of which is hereby incorporated by reference herein in its entirety.

FIELD

The present invention relates to, for example, an object detection device and an object detection computer program that detect an object represented on an image, and a control device that controls an automatic machine including a movable member by using a detection result of the object represented on the image.

BACKGROUND

In an automatic machine such as a robot or a machine tool that includes a movable member, such as an arm which is driven by using a servomotor, techniques for using an image which represents an object as a work target of an automatic machine and acquired by a camera in order to control the automatic machine in response to a relative positional relationship between the movable member and the object as the work target have been proposed. As one of such techniques, a technique for detecting an object from an image by using pattern matching has been proposed (see, for example, Japanese Unexamined Patent Publication (Kokai) No. 2018-158439). Further, as another one of such techniques, a technique for acquiring control information for causing an automatic machine to perform a predetermined operation by inputting an image representing an object as a work target to a classifier achieved by a machine learning technique, such as a neural network, has been proposed (see, for example, Japanese Patent No. 6376296, Japanese Unexamined Patent Publication (Kokai) No. 2009-83095, Japanese Unexamined Patent Publication (Kokai) No. 2018-126799, and Japanese Unexamined Patent Publication (Kokai) No. 2018-205929).

SUMMARY

As in a case where an object as a work target is transported by a belt conveyor or the like, in some cases the object may be moved. In such a case, a position, a posture, and a size of the object represented on an image change depending on a change in a positional relationship between a camera and the object. Thus, a feature of the object used for pattern matching, for example, a part of a surface or a contour of the object when viewed from a specific direction may be hidden, and thereby may become difficult to accurately detect a position and a posture of the object in the pattern matching. As a result, during tracking the object, a control device of an automatic machine cannot continue the tracking of the object, on the basis of a detection result of the object from a time-series of images, and cannot sometimes move a movable member to a position in which work on the object is performed. Furthermore, since a position, a posture, and a size of an object as a work target represented on an image change, a position of the region in which the object is represented on the image may be unknown. In such case, the pattern matching needs to be executed on the entire image in order to detect the object, and it may take too much time required until detection of the object. In such a case, it is difficult for the movable member to follow a positional change of the object.

On the other hand, when a position and a posture of an object as a work target represented on an image are detected by using a classifier in accordance with a machine learning technique, a control device of an automatic machine can detect the object from the image regardless of the position and the posture of the object with respect to a camera. However, in this case, detection accuracy of the position and the posture of the object may be not necessarily sufficient, and therefore the control device cannot sometimes accurately move a movable member to a position at which the movable member can perform work on the object, on the basis of the position of the object detected by the classifier.

In one aspect, it is an object to provide an object detection device that can detect an object as a detection target, even when a relative positional relationship of the object with respect to an image capturing unit that captures the object changes.

According to one embodiment, an object detection device is provided. The object detection device includes: a memory configured to store a template representing a feature of an appearance of a target object when the target object is viewed from a predetermined direction; and a processor configured to detect, when a camera that captures the target object and generates an image representing the target object and the target object do not satisfy a predetermined positional relationship, a position of the target object on the image by inputting the image to a classifier being previously trained in such a way as to detect the target object from the image; and detect, when the camera and the target object satisfy the predetermined positional relationship, a position of the target object on the image by comparing the image with the template.

According to another embodiment, a control device of an automatic machine including at least one movable member is provided. The control device includes: a memory configured to store a template representing a feature of an appearance of a target object as a work target of the automatic machine when the target object is viewed from a predetermined direction; and a processor configured to, when a camera that is attached to the movable member, captures the target object, and generates an image representing the target object and the target object do not satisfy a predetermined positional relationship, detect a position of the target object on the image by inputting the image to a classifier being previously trained in such a way as to detect the target object from the image, and detect a position of the target object in a real space based on a position of the target object on the image; when the camera and the target object satisfy the predetermined positional relationship, detect a position of the target object on the image by comparing the image with the template, and detect a position of the target object in a real space based on the position of the target object on the image, or detect a position of the target object in a real space based on positional information acquired by a sensor that acquires the positional information indicating a relative position with respect to the target object; control the movable member in such a way that the camera and the target object satisfy the predetermined positional relationship based on the position of the target object in a real space detected by using the classifier, when the camera and the target object do not satisfy the predetermined positional relationship; and control the movable member in such a way as to move the movable member to a position in which the automatic machine can perform predetermined work on the target object, based on the position of the target object in a real space detected by using the template, when the camera and the target object satisfy the predetermined positional relationship.

According to still another embodiment, a non-transitory recording medium that stores an object detection computer program is provided. The object detection computer program causes a computer to execute: detecting, when a camera that captures a target object and generates an image representing the target object and the target object do not satisfy a predetermined positional relationship, a position of the target object on the image by inputting the image to a classifier being previously trained in such a way as to detect the target object from the image; and detecting, when the camera and the target object satisfy the predetermined positional relationship, a position of the target object on the image by comparing, with the image, a template representing a feature of an appearance of the target object when the target object is viewed from a predetermined direction.

According to one aspect, even when a relative positional relationship of an object as a detection target with respect to an image capturing unit that captures the object changes, the object can be detected.

DESCRIPTION OF EMBODIMENTS

An object detection device according to an embodiment of the present invention will be described below with reference to the drawings. For example, the object detection device detects an object as a work target (hereinafter, simply referred to as a target object) of an automatic machine including a movable member such as an arm from a series of images acquired by an image capturing unit attached to the movable member of the automatic machine, and detects a position of the target object in a real space. At this time, the object detection device detects a position of the target object on an image in a robust manner by inputting the image to a classifier being previously trained in such a way as to detect the target object from the image, until the image capturing unit and the target object satisfy a predetermined positional relationship, and detects a position of the target object in the real space, on the basis of the detection result. On the other hand, when the image capturing unit and the target object satisfy the predetermined positional relationship, the object detection device detects a position and a posture of the target object on an image with high accuracy by comparing, with the image, a template that is previously prepared and represents a feature of an appearance of the target object when the target object is viewed from a predetermined direction, and detects a position and a posture of the target object in the real space, on the basis of the detection result. Furthermore, the object detection device is incorporated in a control device of the automatic machine, and controls the movable member of the automatic machine in such a way that the automatic machine can perform work on the target object, on the basis of the detected position of the target object or the detected position and the detected posture of the target object.

Figure 1:
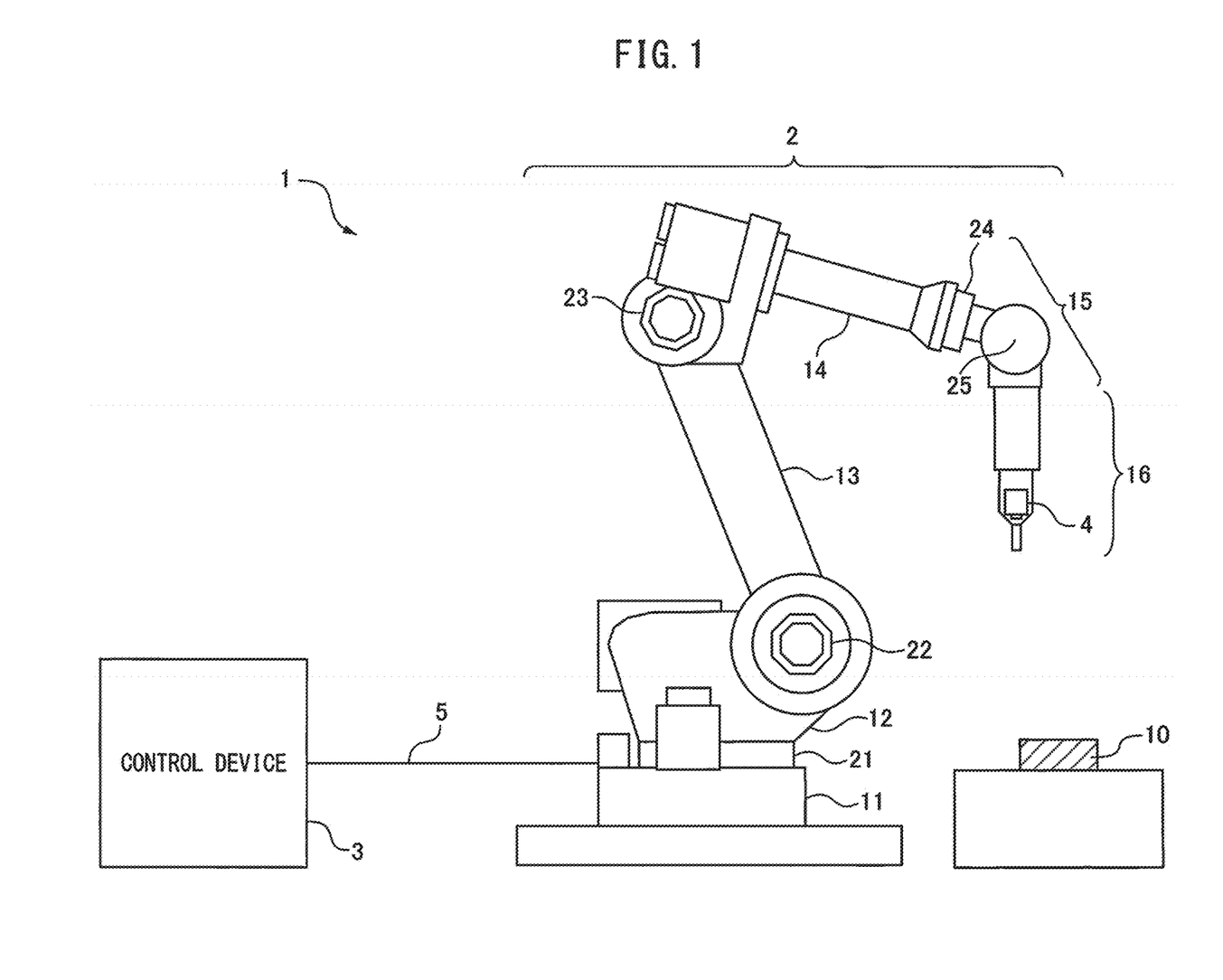
FIG. 1 is a schematic configuration diagram of a robot system according to one embodiment.

FIG. 1 is a schematic configuration diagram of a robot system 1 on which an object detection device is mounted according to one embodiment. The robot system 1 includes a robot 2, a control device 3 that controls the robot 2, and a camera 4 that is attached to a movable member of the robot 2 and is used for capturing a workpiece 10, which is one example of a target object. The robot system 1 is one example of an automatic machine.

The robot 2 includes a base 11, a rotary stage 12, a first arm 13, a second arm 14, a wrist 15, and a tool 16. Each of the rotary stage 12, the first arm 13, the second arm 14, the wrist 15, and the tool 16 is one example of the movable member. Each of the rotary stage 12, the first arm 13, the second arm 14, and the wrist 15 is supported by a shaft provided in a joint to which each of the rotary stage 12, the first arm 13, the second arm 14, and the wrist 15 is attached, and operates by a servomotor driving the shaft. Further, the workpiece 10 is transported by a belt conveyor, for example, and the robot 2 performs predetermined work on the workpiece 10 while the workpiece 10 is located within a predetermined range.

The base 11 is a member serving as a pedestal when the robot 2 is installed on a floor. The rotary stage 12 is rotatably attached to a top surface of the base 11 at a joint 22 by means of, as a rotation center, a shaft (not illustrated) provided perpendicular to the top surface of the base 11.

The first arm 13 is attached, at one end thereof, to the rotary stage 12 at a joint 22 provided on the rotary stage 12. In the present embodiment, as illustrated in FIG. 1, the first arm 13 is rotatable about a shaft (not illustrated) provided in the joint 22 in parallel with the surface of the base 11 to which the rotary stage 12 is attached.

The second arm 14 is attached, on one end side thereof, to the first arm 13 at a joint 23 provided on the other end side of the first arm 13 opposite to the joint 22. In the present embodiment, as illustrated in FIG. 1, the second arm 14 is rotatable about a shaft (not illustrated) provided in the joint 23 in parallel with the surface of the base 11 to which the rotary stage 12 is attached.

The wrist 15 is attached, via a joint 24, to a tip of the second arm 14 opposite to the joint 23. The wrist 15 includes a joint 25, and can be bent with, as a rotation center, a shaft (not illustrated) provided in the joint 25 in parallel with the shaft of the joint 22 and the shaft of the joint 23. Furthermore, the wrist 15 may be rotatable in a surface orthogonal to a longitudinal direction of the second arm 14 with, as a rotation center, a shaft (not illustrated) parallel to the longitudinal direction of the second arm 14.

The tool 16 is attached to a tip of the wrist 15 opposite to the joint 24. The tool 16 includes a mechanism or a device for performing work on the workpiece 10. For example, the tool 16 may include a laser for processing the workpiece 10, or may include a servo gun for welding the workpiece 10. Alternatively, the tool 16 may include a hand mechanism for holding the workpiece 10 or a part assembled to the workpiece 10.

The camera 4 is one example of an image capturing unit, and is attached to the tool 16, for example. Note that the camera 4 may be attached to another movable member such as the wrist 15 or the second arm 14. When the robot 2 performs work on the workpiece 10 or when the tool 16 approaches the workpiece 10, the camera 4 is directed in such a way that the workpiece 10 is included in an image capturing range of the camera 4. Then, the camera 4 generates an image on which the workpiece 10 is represented by capturing the image capturing range including the workpiece 10 at each predetermined image capturing period. Every time the camera 4 generates an image, the camera 4 outputs the generated image to the control device 3 via a communication line 5.

Note that an automatic machine being a control target of the control device 3 is not limited to the robot 2 illustrated in FIG. 1, and may include at least one movable member.

The control device 3 is connected to the robot 2 via the communication line 5, and receives information indicating an operational status of the servomotor that drives the shaft provided in each of the joints of the robot 2, an image from the camera 4, and the like from the robot 2 via the communication line 5. Then, the control device 3 controls the servomotor, on the basis of the received information, the received image, and an operation of the robot 2 being received from a host control device (not illustrated) or being previously set, and thereby controls a position and a posture of each of the movable members of the robot 2.

Figure 2:
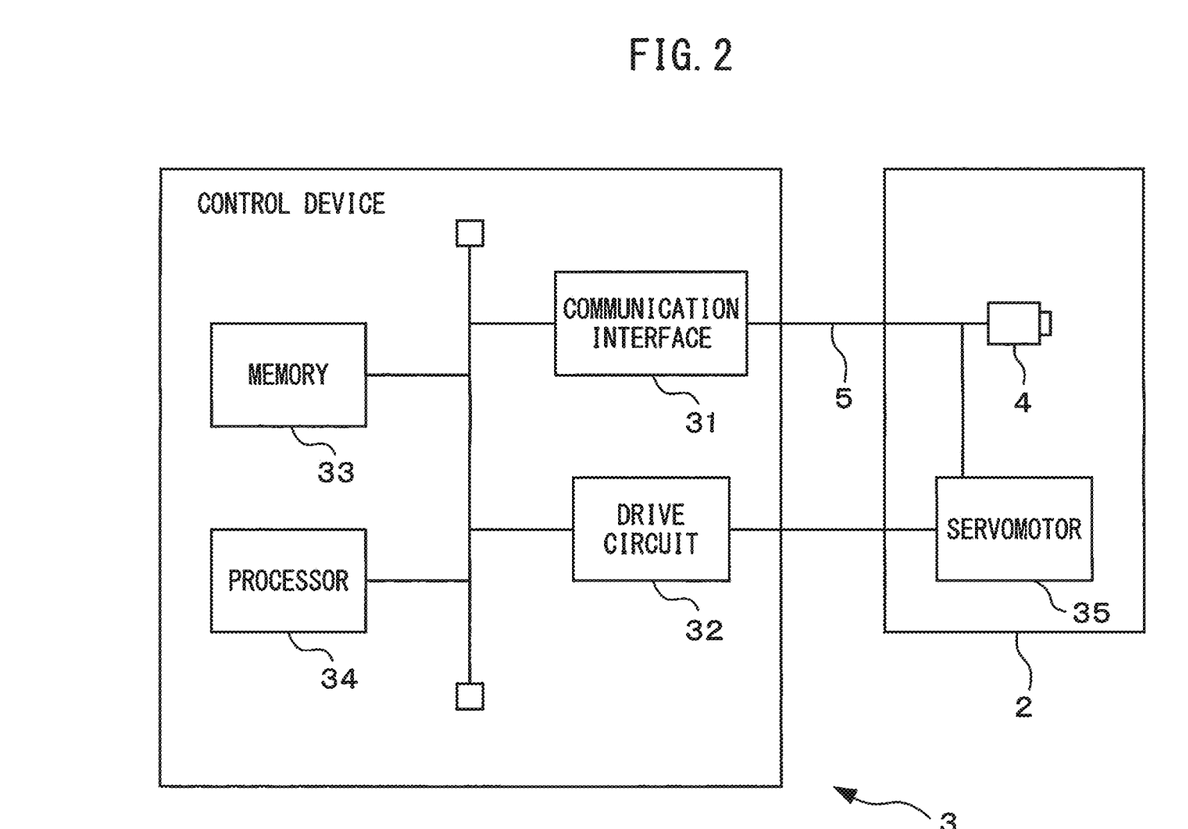
FIG. 2 is a schematic configuration diagram of a control device.

FIG. 2 is a schematic configuration diagram of the control device 3. The control device 3 includes a communication interface 31, a drive circuit 32, a memory 33, and a processor 34. Furthermore, the control device 3 may include a user interface (not illustrated) such as a touch panel.

The communication interface 31 includes, for example, a communication interface for connecting the control device 3 to the communication line 5, a circuit for executing processing related to transmission and reception of a signal via the communication line 5, and the like. Then, the communication interface 31 receives information indicating an operational status of a servomotor 35 as one example of a drive unit, such as a measurement value of an amount of rotation from an encoder for detecting an amount of rotation of the servomotor 35, from the robot 2 via the communication line 5, and passes the information to the processor 34. Note that FIG. 2 illustrates one servomotor 35 representatively, but the robot 2 may include, for each joint, a servomotor that drives a shaft of the joint. Furthermore, the communication interface 31 receives an image from the camera 4, and passes the received image to the processor 34.

The drive circuit 32 is connected to the servomotor 35 via a current supply cable, and supplies electric power corresponding to torque generated by the servomotor 35, a rotation direction, or a rotation speed of the servomotor 35 in accordance with control by the processor 34.

The memory 33 is one example of a storage unit, and includes, for example, a readable-writable semiconductor memory and a read-only semiconductor memory. Furthermore, the memory 33 may include a storage medium such as a semiconductor memory card, a hard disk, or an optical storage medium, and a device that accesses the storage medium.

The memory 33 stores various computer programs for controlling the robot 2 that are executed in the processor 34 of the control device 3, and the like. Further, the memory 33 stores information for controlling an operation of the robot 2 when the robot 2 is operated. Furthermore, the memory 33 stores information indicating an operational status of the servomotor 35 acquired from the robot 2 during operation of the robot 2. Further, the memory 33 stores various pieces of data used in object detection processing. Such data include, for example, a parameter set for defining a classifier, a template representing a feature of an appearance of the workpiece 10 when viewed from a predetermined direction of (for example, from vertically above) the workpiece 10, which is used for detecting the workpiece 10, a camera parameter indicating information related to the camera 4, such as a focal distance, an attached position, and an orientation of the camera 4, and an image acquired from the camera 4.

The processor 34 is one example of a control unit, and includes, for example, a central processing unit (CPU) and a peripheral circuit of the CPU. Furthermore, the processor 34 may include a processor for an arithmetic operation. Then, the processor 34 controls the entirety of the robot system 1. Further, the processor 34 executes movable member control processing including the object detection processing.

Figure 3:
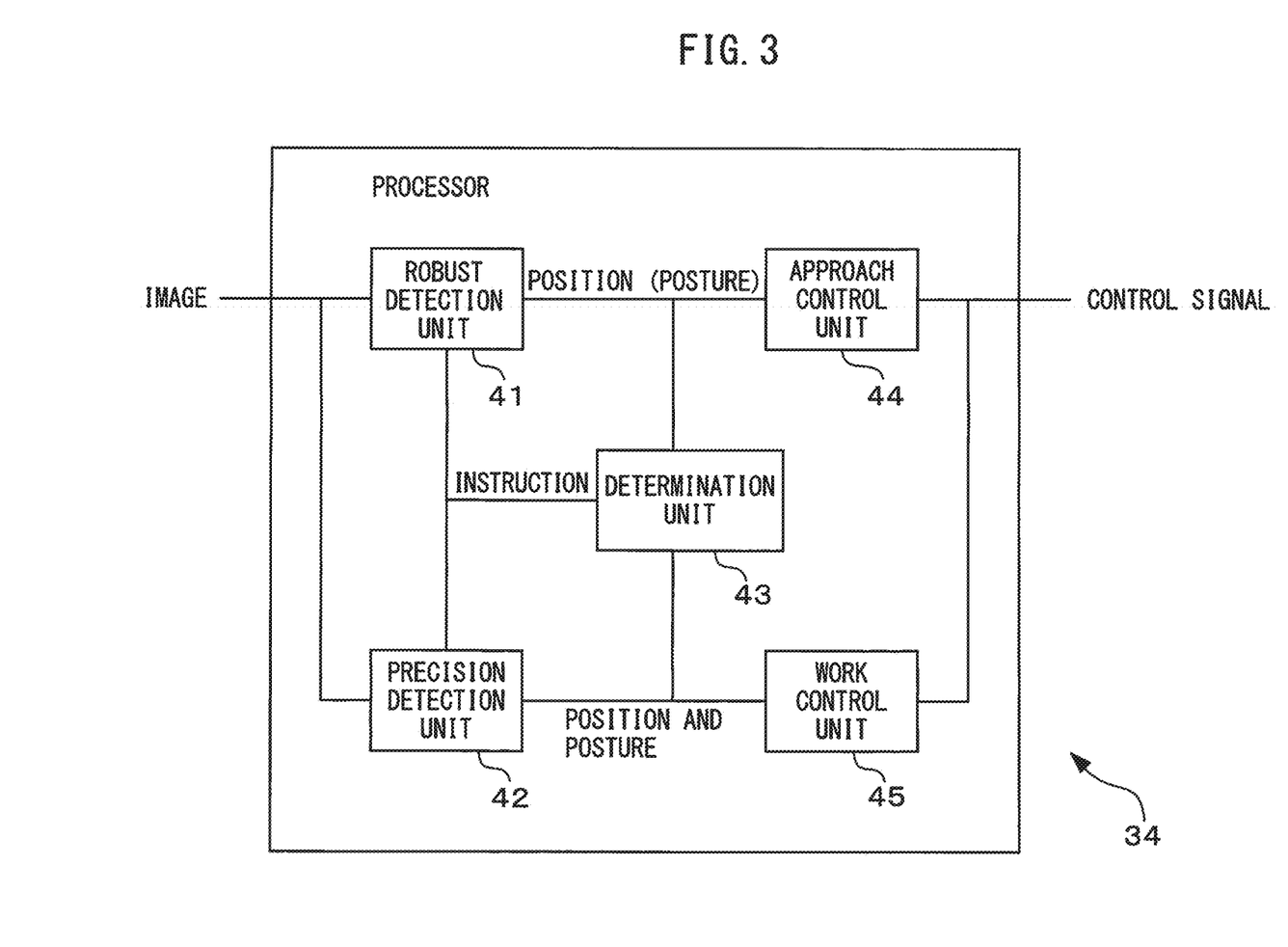
FIG. 3 is a functional block diagram of a processor included in the control device in relation to movable member control processing including object detection processing.

FIG. 3 is a functional block diagram of the processor 34 in relation to the movable member control processing including the object detection processing. The processor 34 includes a robust detection unit 41, a precision detection unit 42, a determination unit 43, an approach control unit 44, and a work control unit 45. Each of these units of the processor 34 is, for example, a functional module implemented by a computer program executed on the processor 34. Alternatively, each of these units may be implemented as a dedicated arithmetic circuit mounted on a part of the processor 34. Further, processing by the robust detection unit 41, the precision detection unit 42, and the determination unit 43 among the units of the processor 34 are included in the object detection processing.

The robust detection unit 41 detects, by inputting each of a time-series of images acquired by the camera 4 to the classifier, a position of the workpiece 10 on the image, i.e., a position of a target object when the camera 4 and the workpiece 10 do not satisfy a predetermined positional relationship. Then, the robust detection unit 41 detects a position of the workpiece 10 in a real space, on the basis of the detected position of the workpiece 10 on the image. Since the robust detection unit 41 detects a position of the workpiece 10 by using the classifier, the robust detection unit 41 can detect a position of the workpiece 10 in a robuster manner than the precision detection unit 42. Since the robust detection unit 41 may execute the same processing on each image, processing on one image will be described below. Further, the predetermined positional relationship will be described in detail with the determination unit 43.

The classifier has been trained in such a way as to detect the workpiece 10 represented on an image. For example, the robust detection unit 41 can use, as the classifier, a convolutional neural network (CNN) being previously trained in such a way as to detect an object represented on an image and indicate a region in which the detected object is represented, such as a VGG or a single shot multibox detector (SSD). In this case, the robust detection unit 41 can obtain a circumscribed rectangle (i.e., bounding box) of the workpiece 10 represented on the image by inputting an image of interest to the classifier.

Alternatively, the robust detection unit 41 may use, as the classifier, a classifier being previously trained in accordance with another machine learning technique, such as a support vector machine or AdaBoost. In this case, the robust detection unit 41 sets a plurality of windows different from each other for an image of interest, and extracts a feature amount, such as histograms of oriented gradients (HOG) or a Haar-Like feature, from each of the windows. Note that, when a position of the workpiece 10 is detected in an image being acquired in the past, the robust detection unit 41 may set a plurality of windows being limited near the detected position. Then, the robust detection unit 41 inputs the feature amount extracted from the window to the classifier for each of the windows. When the feature amount is input, the classifier outputs a determination result whether or not the workpiece 10 is represented in the window. Therefore, the robust detection unit 41 can determine that the workpiece 10 is represented in the window whose determination result that the workpiece 10 is represented is output from the classifier.

As described above, when a region in which the workpiece 10 is represented on the image is detected, the robust detection unit 41 sets a predetermined position in the region, for example, the centroid of the region, as a position of the workpiece 10 on the image.

When the position of the workpiece 10 on the image is acquired, the robust detection unit 41 detects a position of the workpiece 10 in a real space, on the basis of the position.

Herein, a position of each pixel on the image has a one-to-one correspondence with a bearing when viewed from the camera 4. Thus, the robust detection unit 41 can determine, for example, a bearing associated with the centroid of the region in which the workpiece 10 is represented on the image as a bearing from the camera 4 toward the workpiece 10. Furthermore, the robust detection unit 41 can calculate an estimated distance from the camera 4 to the workpiece 10 by multiplying a predetermined reference distance by a ratio of an area of the workpiece 10 on the image when a distance from the camera 4 to the workpiece 10 is the reference distance to an area of the region in which the workpiece 10 is represented on the image. Therefore, the robust detection unit 41 can detect a position of the workpiece 10 in a camera coordinate system with reference to a position of the camera 4, on the basis of the bearing from the camera 4 toward the workpiece 10 and the estimated distance. Then, the robust detection unit 41 outputs the detected position of the workpiece 10 to the determination unit 43 and the approach control unit 44.

According to a modified example, the robust detection unit 41 may detect not only a position of the workpiece 10 but also a posture of the workpiece 10. In this case, the robust detection unit 41 can use, as the classifier, a CNN being previously trained in such a way as to detect a region in which an object is represented on an image and a posture of the object (see, for example, B Tekin and others, "Real-Time Seamless Single Shot 6D Object Pose Prediction", CVPR2018). The robust detection unit 41 can detect not only a position of the workpiece 10 on an image but also a posture of the workpiece 10 when viewed from the camera 4, that is, indicated in the camera coordinate system, by inputting the image to such a classifier. The detected posture of the workpiece 10 is indicated by a combination of a roll angle, a pitch angle, and a yaw angle, for example.

In this case, the robust detection unit 41 may output the detected position and the detected posture of the workpiece 10 to the determination unit 43 and the approach control unit 44.

When the camera 4 and the workpiece 10 satisfy the predetermined positional relationship, the precision detection unit 42 detects, by comparing each of a time-series of images acquired by the camera 4 with a template, a position and a posture of the workpiece 10 on the image with higher accuracy than the robust detection unit 41. Then, the precision detection unit 42 detects a position and a posture of the workpiece 10 in a real space, on the basis of the detected position and the detected posture of the workpiece 10 on the image. Since the precision detection unit 42 may execute the same processing on each image, processing on one image will be described below. For example, the precision detection unit 42 reads a template from the memory 33, and compares the template with an image of interest to detect a region in which the workpiece 10 is represented on the image. For example, the template can represent an image of the workpiece 10 when viewed from a predetermined direction. In this case, the precision detection unit 42 calculates a value representing a degree of similarity between the template and the image, such as a cross-correlation value between the template and the image, while changing a relative position and a relative orientation of the template with respect to the image within a matching range on the image, and determines that the workpiece 10 is represented in a region corresponding to a position of the template when the degree of similarity is equal to or greater than a predetermined threshold value. Further, the precision detection unit 42 can calculate an actual amount of rotation of the workpiece 10 with respect to an orientation of the workpiece 10 represented on the template when viewed from a predetermined direction on the basis of an orientation of the template when the degree of similarity is equal to or greater than the predetermined threshold value. Thus, the precision detection unit 42 can obtain a posture of the workpiece 10 on the basis of the amount of rotation. Note that the precision detection unit 42 may set, for example, as the matching range, a predetermined range around of a predicted position of the workpiece 10 on an image of interest which is calculated by applying a prediction filter, such as a Kalman filter, to a position of the workpiece 10 (for example, the centroid of a region in which the workpiece 10 is represented) which is detected in each of a series of images acquired before the image of interest.

Further, the template may represent a plurality of feature points of the workpiece 10 when viewed from the predetermined direction, for example, a plurality of points on a contour of the workpiece 10. In this case, the precision detection unit 42 may detect the plurality of feature points by applying, to the matching range on the image, an edge detection filter such as a Sobel filter or a corner detection filter such as a Harris filter, or another feature point detection filter such as a SIFT. Then, the precision detection unit 42 may calculate, as a degree of similarity, a ratio of the number of feature points on the template coinciding with feature points on the image to the number of feature points on the template for each position of the template while changing a relative position and a relative orientation of the template with respect to the image within the matching range. In this case also, the precision detection unit 42 may determine that the workpiece 10 is represented in a region corresponding to a position of the template when the degree of similarity is equal to or greater than the predetermined threshold value.

Alternatively, when a difference between brightness of the workpiece 10 and brightness of a background around the workpiece 10 is great, the precision detection unit 42 can detect a region in which the workpiece 10 is represented by binarizing each pixel of an image on the basis of a luminance value of the pixel. For example, when the workpiece 10 is brighter than the surrounding, the precision detection unit 42 can detect a pixel having a luminance value higher than a predetermined luminance threshold value, and set, as a region in which the workpiece 10 is represented, a region constituted of a set of the detected pixels. In this case, for example, the precision detection unit 42 may compare, for each posture of the workpiece 10, a template prepared for the posture with the region in which the workpiece 10 is represented, and determine, as an actual posture of the workpiece 10, the posture corresponding to the template having the closest shape to the region in which the workpiece 10 is represented. Note that, in this case, the template can also be made into a binary image in which the region representing the workpiece and another region have different values.

When a position of the region in which the workpiece 10 is represented on the image is determined, the precision detection unit 42 can determine a position of the workpiece 10 indicated in the camera coordinate system, similarly to the robust detection unit 41. Furthermore, the precision detection unit 42 can determine a posture of the workpiece 10 indicated in the camera coordinate system by rotating the posture of the workpiece 10 on the image by a difference between a predetermined direction defined for the template and a bearing from the camera 4 corresponding to the centroid of the region in which the workpiece 10 is represented.

Note that a plurality of templates may be previously prepared. In this case, each of the templates may vary in a combination of a direction in which the workpiece 10 is viewed and a size of the workpiece 10 on the template. In this case, the precision detection unit 42 calculates, for each of the plurality of templates, a degree of similarity for each position of the template while changing a relative position and a relative orientation of the template with respect to the image within the matching range, similarly to the description above. Then, the precision detection unit 42 may determine that the workpiece 10 viewed from a direction indicated on the template having the greatest degree of similarity is represented in a region corresponding to a position of the template. Furthermore, a size of the workpiece 10 represented on the template corresponds to a distance from the camera 4 to the workpiece 10. Thus, the precision detection unit 42 can determine a distance corresponding to a size of the workpiece 10 represented on the template having the greatest degree of similarity as a distance from the camera 4 to the workpiece 10.

The precision detection unit 42 may detect a position of the workpiece 10 in a real space by another technique. For example, the precision detection unit 42 can detect an absolute position (i.e., a position indicated in a world coordinate system) of each of the movable members of the robot 2, on the basis of the amount of rotation of the servomotor 35 from a position in which the robot 2 takes a reference posture, and can detect a position and an orientation of the camera 4 in the world coordinate system, on the basis of a relationship between the detected absolute position, and an attached position of the camera 4 and an orientation of the camera 4. Then, the precision detection unit 42 can determine a bearing from the camera 4 toward the workpiece 10 in the world coordinate system, on the basis of the centroid of the region in which the workpiece 10 is represented on the image. Furthermore, when a position of a belt conveyor that transports the workpiece 10 in the world coordinate system and a thickness of the workpiece 10 are known (these values are previously stored in the memory 33, for example), the precision detection unit 42 can determine a position of the camera 4 in the world coordinate system, and can thus calculate a distance from the camera 4 to the belt conveyor that transports the workpiece 10 in the bearing from the camera 4 toward the workpiece 10. Then, the precision detection unit 42 can obtain a value calculated by subtracting the thickness of the workpiece 10 from the calculated distance as a distance from the camera 4 to the workpiece 10. The precision detection unit 42 can detect a position of the workpiece 10 in a real space from the bearing from the camera 4 toward the workpiece 10 and the distance to the workpiece 10 that are acquired in such a manner.

The precision detection unit 42 outputs the detected position and the detected posture of the workpiece 10 to the determination unit 43 and the work control unit 45.

The determination unit 43 determines whether or not the camera 4 and the workpiece 10 satisfy a predetermined positional relationship every time an image is acquired from the camera 4. The predetermined positional relationship can be set that, for example, a distance between the camera 4 and the workpiece 10 is equal to or less than a predetermined distance. For example, the predetermined distance can be a distance between the camera 4 and the workpiece 10 corresponding to a size of the workpiece 10 represented on a template used by the precision detection unit 42. For example, when the robust detection unit 41 detected a position of the workpiece 10 for the newest image, the determination unit 43 compares an estimated distance from the camera 4 to the workpiece 10, which was calculated by the robust detection unit 41 with the predetermined distance. Then, when the estimated distance is equal to or less than the predetermined distance, the determination unit 43 determines that the camera 4 and the workpiece 10 satisfy the predetermined positional relationship. Then, the determination unit 43 instructs the precision detection unit 42 to detect a position and a posture of the workpiece 10 for an image being acquired next. On the other hand, when the estimated distance is greater than the predetermined distance, the determination unit 43 determines that the camera 4 and the workpiece 10 do not satisfy the predetermined positional relationship. Then, the determination unit 43 instructs the robust detection unit 41 to detect a position of the workpiece 10 for an image being acquired next.

Note that, in a case where a coordinate system of the robot 2 is moved on the basis of an amount of movement of the workpiece 10 and an operation program of the robot 2 is coded so that the robot 2 operates on the coordinate system, the determination unit 43 may switch from the robust detection unit 41 to the precision detection unit 42 when the robot 2 reaches a predetermined position on the coordinate system.

Similarly, when the precision detection unit 42 detected a position of the workpiece 10 for the newest image, the determination unit 43 compares a distance from the camera 4 to the workpiece 10, which was calculated by the precision detection unit 42 with the predetermined distance. Then, when the distance is equal to or less than the predetermined distance, the determination unit 43 determines that the camera 4 and the workpiece 10 satisfy the predetermined positional relationship. Then, the determination unit 43 instructs the precision detection unit 42 to detect a position and a posture of the workpiece 10 for an image being acquired next. On the other hand, when the distance is greater than the predetermined distance, the determination unit 43 determines that the camera 4 and the workpiece 10 do not satisfy the predetermined positional relationship. Then, the determination unit 43 instructs the robust detection unit 41 to detect a position of the workpiece 10 for an image being acquired next.

Alternatively, the predetermined positional relationship may be set that a distance between the camera 4 and the workpiece 10 is equal to or less than a predetermined distance, and the workpiece 10 takes a predetermined posture with respect to the camera 4. The predetermined posture may be, for example, a posture in which the camera 4 is located within a predetermined angle range from a normal line of a predetermined surface of the workpiece 10. The predetermined surface can be, for example, a surface of the workpiece 10 represented on a template used by the precision detection unit 42. In this case, when the robust detection unit 41 detected a position and a posture of the workpiece 10 for the newest image, the determination unit 43 may determine whether or not the detected posture is a predetermined posture. Then, when an estimated distance from the camera 4 to the workpiece 10 which was calculated by the robust detection unit 41 is equal to or less than the predetermined distance, and the posture of the workpiece 10 is the predetermined posture, the determination unit 43 determines that the camera 4 and the workpiece 10 satisfy the predetermined positional relationship. Then, the determination unit 43 instructs the precision detection unit 42 to detect a position and a posture of the workpiece 10 for an image being acquired next. On the other hand, when the estimated distance is greater than the predetermined distance or the posture of the workpiece 10 is not the predetermined posture, the determination unit 43 determines that the camera 4 and the workpiece 10 do not satisfy the predetermined positional relationship. Then, the determination unit 43 instructs the robust detection unit 41 to detect a position of the workpiece 10 for an image being acquired next.

Similarly, when the precision detection unit 42 detected a position and a posture of the workpiece 10 for the newest image, the determination unit 43 determines that the camera 4 and the workpiece 10 satisfy the predetermined positional relationship in a case where a distance from the camera 4 to the workpiece 10, which was calculated by the precision detection unit 42 is equal to or less than the predetermined distance, and the posture of the workpiece 10 is the predetermined posture. Then, the determination unit 43 instructs the precision detection unit 42 to detect a position and a posture of the workpiece 10 for an image being acquired next. On the other hand, when the distance is greater than the predetermined distance or the posture of the workpiece 10 is not the predetermined posture, the determination unit 43 determines that the camera 4 and the workpiece 10 do not satisfy the predetermined positional relationship. Then, the determination unit 43 instructs the robust detection unit 41 to detect a position of the workpiece 10 for an image being acquired next.

The approach control unit 44 controls the movable member of the robot 2 in such a way that the camera 4 and the workpiece 10 satisfy the predetermined positional relationship, on the basis of the position of the workpiece 10 detected by the robust detection unit 41 when the camera 4 and the workpiece 10 do not satisfy the predetermined positional relationship. For example, the approach control unit 44 predicts a position of the workpiece 10 in the world coordinate system at the time when a next image is generated by applying a prediction filter such as a Kalman filter to a position of the workpiece 10 in a real space which was detected for each of a series of images in the latest period, for example. Then, the approach control unit 44 sets a target position in which the camera 4 satisfies the predetermined positional relationship from the predicted position of the workpiece 10. The approach control unit 44 may set the amount of rotation and a rotation direction of the servomotor 35 in such a way as to operate the movable member of the robot 2 to which the camera 4 is attached in order to move the camera 4 to the target position.

At this time, the approach control unit 44 calculates, for each of the images in the latest period, a conversion equation from the camera coordinate system to the world coordinate system when the image was generated, for example, from a position and an orientation of the camera 4 in the world coordinate system. For example, the approach control unit 44 can detect, for each image, an absolute position of each of the movable members of the robot 2, on the basis of the amount of rotation of the servomotor 35 at the time of generation of the image from a position of each of the movable members when the robot 2 takes a reference posture. Furthermore, the approach control unit 44 may detect, for each image, a position and an orientation of the camera 4 in the world coordinate system, on the basis of a relationship between the detected absolute position, and an attached position of the camera 4 and an orientation of the camera 4, and calculate a conversion equation from the camera coordinate system to the world coordinate system, on the basis of the detection result. Then, the approach control unit 44 detects, for each image, a position of the workpiece 10 indicated in the world coordinate system by applying the conversion equation to a position of the workpiece 10 indicated in the camera coordinate system at the time of generation of the image. Then, as described above, the approach control unit 44 can calculate a predicted position of the workpiece 10 in the world coordinate system at the time of generation of a next image by applying a prediction filter to the detected position of the workpiece 10 in the world coordinate system at the time of generation of each image.

When the predicted position of the workpiece 10 in the world coordinate system is calculated, and a distance between the camera 4 and the workpiece 10 is equal to or less than a predetermined distance in the predetermined positional relationship, the approach control unit 44 can identify a position having the predetermined distance from the predicted position as a target position. Then, the approach control unit 44 may determine a target amount of rotation and a target rotation direction of the servomotor 35 in order to move the camera 4 to the target position.

Further, it is assumed that the predetermined positional relationship is set that a distance between the camera 4 and the workpiece 10 is equal to or less than a predetermined distance, the workpiece 10 takes a predetermined posture with respect to the camera 4, and a position and a posture of the workpiece 10 in a real space are detected by the robust detection unit 41. In this case, the approach control unit 44 may predict a posture of the workpiece 10 at the time of generation of a next image, on the basis of a posture of the workpiece 10 at the time of generation of each image in the latest period. In this case also, the approach control unit 44 may predict a posture of the workpiece 10 in the world coordinate system at the time of generation of a next image by applying a prediction filter to a posture of the workpiece 10 in the world coordinate system being calculated by applying the conversion equation from the camera coordinate system to the world coordinate system to a posture of the workpiece 10 indicated in the camera coordinate system at the time of generation of each image in the latest period, similarly to the description above. Then, the approach control unit 44 can calculate a target position and a target posture of the camera 4 in such a way that a distance between the camera 4 and the workpiece 10 is equal to or less than the predetermined distance and the workpiece 10 takes the predetermined posture with respect to the camera 4, on the basis of the predicted position and the predicted posture of the workpiece 10. The approach control unit 44 may determine a target amount of rotation and a target rotation direction of the servomotor 35 in such a way that the camera 4 is moved to the target position and the camera 4 takes the target posture.

Note that, when the workpiece 10 is stationary, the approach control unit 44 may determine a target position and a target posture by setting a detected position and a detected posture of the workpiece 10 at the time of generation of the newest images as the predicted position and the predicted posture described above, and determine a target amount of rotation and a target rotation direction of the servomotor 35.

When the approach control unit 44 determines the target amount of rotation and the target rotation direction of the servomotor 35, the approach control unit 44 may control the servomotor 35 as described in Japanese Unexamined Patent Publication (Kokai) No. 2006-172149, for example. In other words, when controlling an operation of the robot 2, the approach control unit 44 calculates a speed instruction that instructs a rotation speed of the servomotor 35, on the basis of the target amount of rotation, the target rotation direction, an actual amount of rotation of the servomotor 35, and the like. The approach control unit 44 performs speed loop control, on the basis of the speed instruction and a speed feedback calculated by differentiating the actual amount of rotation of the servomotor 35, to calculate a torque instruction indicating a current amount supplied to the servomotor 35. Then, the approach control unit 44 performs loop control on a current supplied to the servomotor 35, on the basis of the torque instruction and a current feedback being fed back from a current detector (not illustrated) provided in the drive circuit 32, to drive the servomotor 35.

The work control unit 45 controls each of the movable members of the robot 2 in such a way that the tool 16 of the robot 2 moves to a position in which the tool 16 can perform work on the workpiece 10, on the basis of a position and a posture of the workpiece 10 detected by the precision detection unit 42 when the camera 4 and the workpiece 10 satisfy the predetermined positional relationship. At this time, similarly to the approach control unit 44, the work control unit 45 may calculate a predicted position and a predicted posture of the workpiece 10 at the time of generation of a next image by applying a prediction filter such as a Kalman filter to a position and a posture in the world coordinate system of the workpiece 10 which was detected for each of a series of images in the latest period. Then, the work control unit 45 may determine the amount of rotation and a rotation direction of the servomotor 35 by setting a target position and a target orientation of the tool 16, on the basis of the predicted position and the predicted posture.

Alternatively, the work control unit 45 may control each of the movable members of the robot 2 in such that the workpiece 10 is represented in an image generated by the camera 4 at a predetermined position and a predetermined size corresponding to a position in which the tool 16 performs work on the workpiece 10. In this case, the work control unit 45 may control each of the movable members of the robot 2 in accordance with a technique for controlling a robot on the basis of an image of a target object acquired by a camera, such as a position-based method or a feature-based method, for example (see, for example, Hashimoto, "Vision and Control", The Society of Instrument and Control Engineers Control Division Convention Workshop, Kyoto, pp. 37 to 68, 2001).

As described above, the work control unit 45 controls the movable member of the robot 2, on the basis of a relative position and a relative posture of the workpiece 10 with respect to the camera 4 that are detected with high accuracy, and therefore the work control unit 45 can control the robot 2 in such a way that work is appropriately performed on the workpiece 10.

Figure 4:
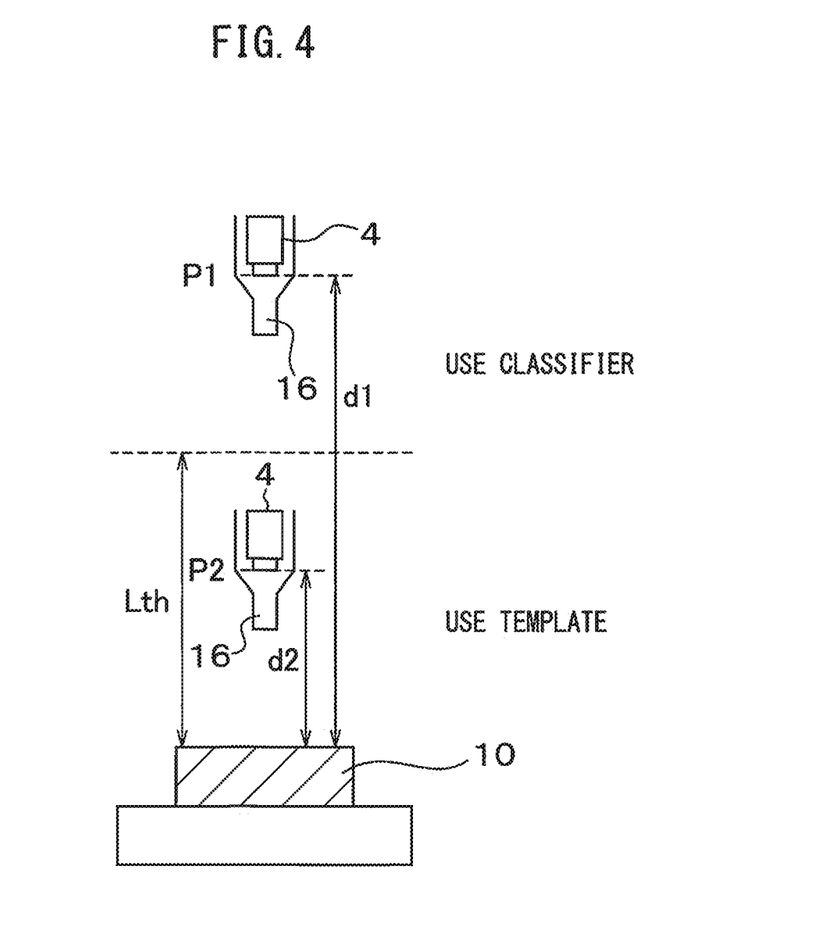
FIG. 4 is a diagram illustrating an overview of the movable member control processing including the object detection processing.

FIG. 4 is a diagram illustrating an overview of the movable member control processing including the object detection processing. In this example, it is assumed that a predetermined positional relationship is set that a distance between the camera 4 and the workpiece 10 is equal to or less than a predetermined distance Lth. As illustrated in FIG. 4, when the camera 4 is present in position P1, a distance d1 between the camera 4 and the workpiece 10 is greater than the predetermined distance Lth, and thus the robust detection unit 41 detects a position (or a position and a posture) of the workpiece 10 by using a classifier. Then, the approach control unit 44 controls the movable member of the robot 2 on the basis of the detection result, and brings the camera 4 close to the workpiece 10. On the other hand, when the camera 4 is present in position P2, a distance d2 between the camera 4 and the workpiece 10 is smaller than the predetermined distance Lth, and thus the precision detection unit 42 detects a position and a posture of the workpiece 10 by using a template. Then, the approach control unit 45 controls the movable member of the robot 2 on the basis of the detection result, and moves the tool 16 to which the camera 4 is attached to a position in which the tool 16 can perform work on the workpiece 10.

Figure 5:
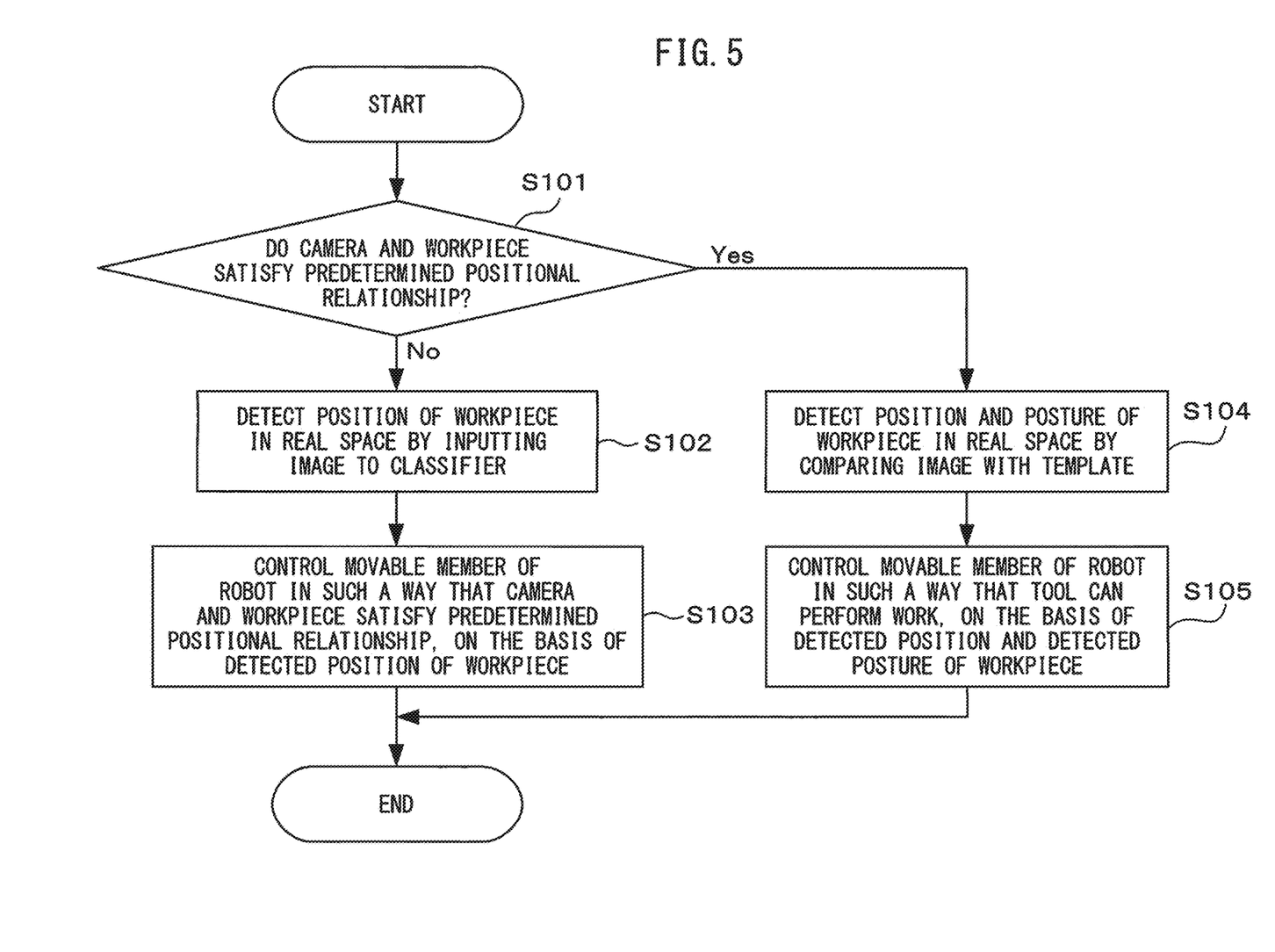
FIG. 5 is an operation flowchart of the movable member control processing including the object detection processing.

FIG. 5 is an operation flowchart of the movable member control processing including the object detection processing. The processor 34 executes the movable member control processing every time an image is acquired from the camera 4 in accordance with the operation flowchart described below. Note that processing in steps S101 to S102 and S104 in the following operation flowchart is included in the object detection processing.

The determination unit 43 determines whether or not the camera 4 and the workpiece 10 satisfy a predetermined positional relationship, on the basis of a detection result of a position and a posture of the workpiece 10 at the time of generation of a previous image (step S101). When the camera 4 and the workpiece 10 do not satisfy the predetermined positional relationship (No in step S101), the determination unit 43 instructs the robust detection unit 41 to detect a position of the workpiece 10. Then, the robust detection unit 41 detects, by inputting the newest image to a classifier, a position of the workpiece 10 on the image, and detects a position of the workpiece 10 in a real space, on the basis of the detection result (step S102). Furthermore, the approach control unit 44 controls the movable member of the robot 2 in such a way that the camera 4 and the workpiece 10 satisfy the predetermined positional relationship, on the basis of the detected position of the workpiece 10 (step S103).

On the other hand, when the camera 4 and the workpiece 10 satisfy the predetermined positional relationship (Yes in step S101), the determination unit 43 instructs the precision detection unit 42 to detect a position and a posture of the workpiece 10. Then, the precision detection unit 42 detects, by comparing the newest image with a template, a position and a posture of the workpiece 10 on the image, and detects a position and a posture of the workpiece 10 in a real space, on the basis of the detection result (step S104). Furthermore, the work control unit 45 controls the movable member of the robot 2 in such a way that the tool 16 moves to a position in which the tool 16 can perform work on the workpiece 10, on the basis of the detected position and the detected posture of the workpiece 10 (step S105).

After step S103 or S105, the processor 34 finishes the movable member control processing.

As described above, when an image capturing unit and a target object do not satisfy a predetermined positional relationship, the object detection device detects a position of the target object in a robust manner by using a classifier trained in accordance with a machine learning technique. On the other hand, when the image capturing unit and the target object satisfy the predetermined positional relationship, the object detection device detects a position and a posture of the target object on an image with high accuracy by comparing, with the image, a template that is acquired in advance and represents a feature of an appearance of the target object when viewed from a predetermined direction. Thus, the object detection device can detect the target object even when a relative positional relationship of the target object with respect to the image capturing unit changes. Furthermore, the object detection device can detect a position of the target object in a real space by using only one image capturing unit without using a stereo method of acquiring a position of a target object in a real space by using a plurality of cameras. Furthermore, when the image capturing unit and the target object do not satisfy the predetermined positional relationship, a control device of a robot that incorporates the object detection device controls a movable member of the robot in such a way that the image capturing unit and the target object satisfy the predetermined positional relationship, on the basis of a position of the target object detected by using the classifier. On the other hand, when the image capturing unit and the target object satisfy the predetermined positional relationship, the control device controls the movable member of the robot in such a way that work can be performed on the target object, on the basis of a position and a posture of the target object detected as a result of template matching. Thus, even when a relative positional relationship between the image capturing unit and the target object changes, the control device can continue tracking the target object, and can appropriately control the movable member of the robot in accordance with the positional relationship.

Note that, when a shape does not change even by rotating about a central axis as in a case where the workpiece 10 has a cylindrical shape, when the workpiece 10 is disposed in a specific posture, or the like, the precision detection unit 42 may not detect a posture of the workpiece 10 on an image and in a real space.

According to a modified example, a positional information acquisition unit that acquires positional information indicating a relative position with respect to the workpiece 10, which is used for detecting a position and a posture of the workpiece 10 by the precision detection unit 42, may be provided separately from the camera 4. For example, one or more pressure sensors may be attached to a tip of the tool 16. The pressure sensor is one example of the positional information acquisition unit. In this case, the precision detection unit 42 may refer to a reference table indicating a relationship between pressure detected by the pressure sensor and a distance between a predetermined portion of the tool 16 and the workpiece 10, and detect the distance between the predetermined portion of the tool 16 and the workpiece 10 corresponding to the detected pressure. Note that such a reference table is stored in the memory 33 in advance, for example. As in the embodiment described above, the work control unit 45 controls the movable member of the robot 2, on the basis of an image acquired by the camera 4, to move the tool 16 to a position in which the pressure sensor can contact the workpiece 10. Subsequently, the work control unit 45 may control the movable member of the robot 2 in such a way that pressure detected by the pressure sensor has a predetermined value. In this case, the pressure detected by the pressure sensor is one example of the positional information.

Alternatively, another camera separate from the camera 4 may be attached to the movable member of the robot 2, and the precision detection unit 42 may detect a position and a posture of the workpiece 10 by executing processing similar to that in the embodiment described above on an image generated by the separate camera. Alternatively, a distance sensor such as a depth camera may be attached to the movable member of the robot 2. Then, the precision detection unit 42 may detect a position and a posture of the workpiece 10 with reference to the distance sensor, on the basis of a measurement value of a distance to each portion of the workpiece 10 being detected by the distance sensor. Note that the separate camera and the distance sensor are another example of the positional information acquisition unit, and an image generated by the separate camera and a measurement value of a distance by the distance sensor are another example of the positional information.

According to another embodiment, the camera 4 may be fixedly attached separately from the movable member of the robot 2. For example, the camera 4 may be attached to a ceiling in a room where the robot 2 is installed in such a way as to direct downward. In this case, for each pixel of an image acquired by the camera 4, a distance table indicating a distance between the camera 4 and the workpiece 10 when the workpiece 10 is located in a bearing corresponding to the pixel when viewed from the camera 4 may be stored in the memory 33 in advance. When detecting a region in which the workpiece 10 is represented on the image, the robust detection unit 41 and the precision detection unit 42 may detect a position of the workpiece 10 in a real space by referring to the distance table, and estimating a distance corresponding to a pixel in which the centroid of the region is located as a distance from the camera 4 to the workpiece 10. Further, in this case, since a position of the camera 4 does not change, the robust detection unit 41 and the precision detection unit 42 can easily acquire a position and a posture of the workpiece 10 in the world coordinate system by applying the conversion equation from the camera coordinate system with reference to the position of the camera 4 to the world coordinate system to a position and a posture of the workpiece 10 indicated in the camera coordinate system. Then, the approach control unit 44 and the work control unit 45 may control the movable member of the robot 2 similarly to the embodiment described above, on the basis of the position and the posture of the workpiece 10 indicated in the world coordinate system.

According to still another embodiment, the object detection device may be provided separately from the control device of the robot 2.

Figure 6:
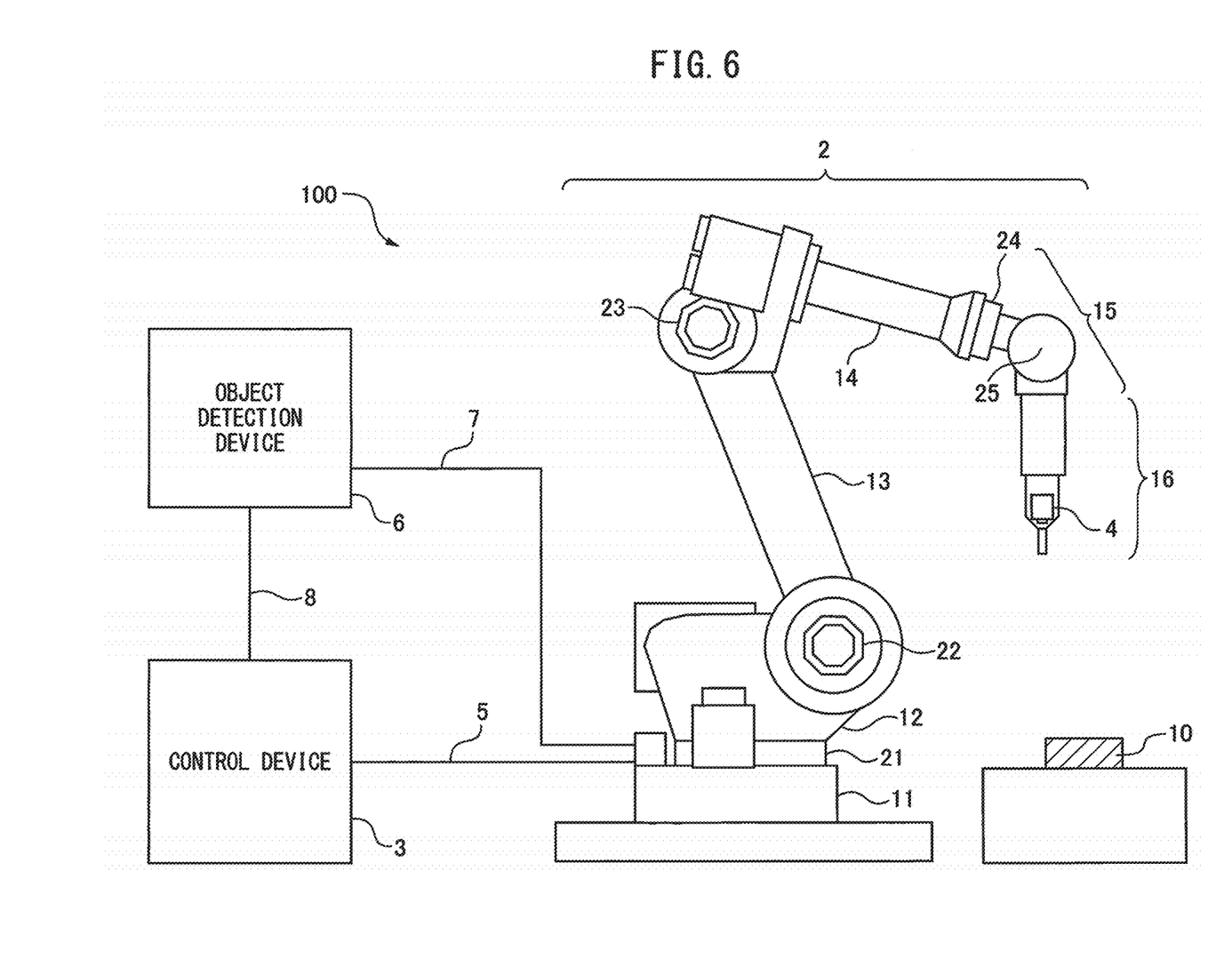
FIG. 6 is a schematic configuration diagram of a robot system according to a modified example.

FIG. 6 is a schematic configuration diagram of a robot system 100 according to the modified example. The robot system 100 includes a robot 2, a control device 3 that controls the robot 2, a camera 4 that is attached to a movable member of the robot 2 and is used for capturing a workpiece 10, which is one example of a target object, and an object detection device 6. The robot 2 and the control device 3 are communicably connected to each other via a communication line 5. Furthermore, the camera 4 and the object detection device 6 are communicably connected to each other via a communication line 7, and the control device 3 and the object detection device 6 are communicably connected to each other via a communication line 8. Note that the camera 4, the control device 3, and the object detection device 6 may be communicably connected to each other via a communication network in conformity to predetermined communication standard.

The robot system 100 is different from the robot system 1 illustrated in FIG. 1 in that the object detection device 6 is provided separately from the control device 3. Thus, hereinafter, the object detection device 6 and a related portion thereof will be described.

Figure 7:
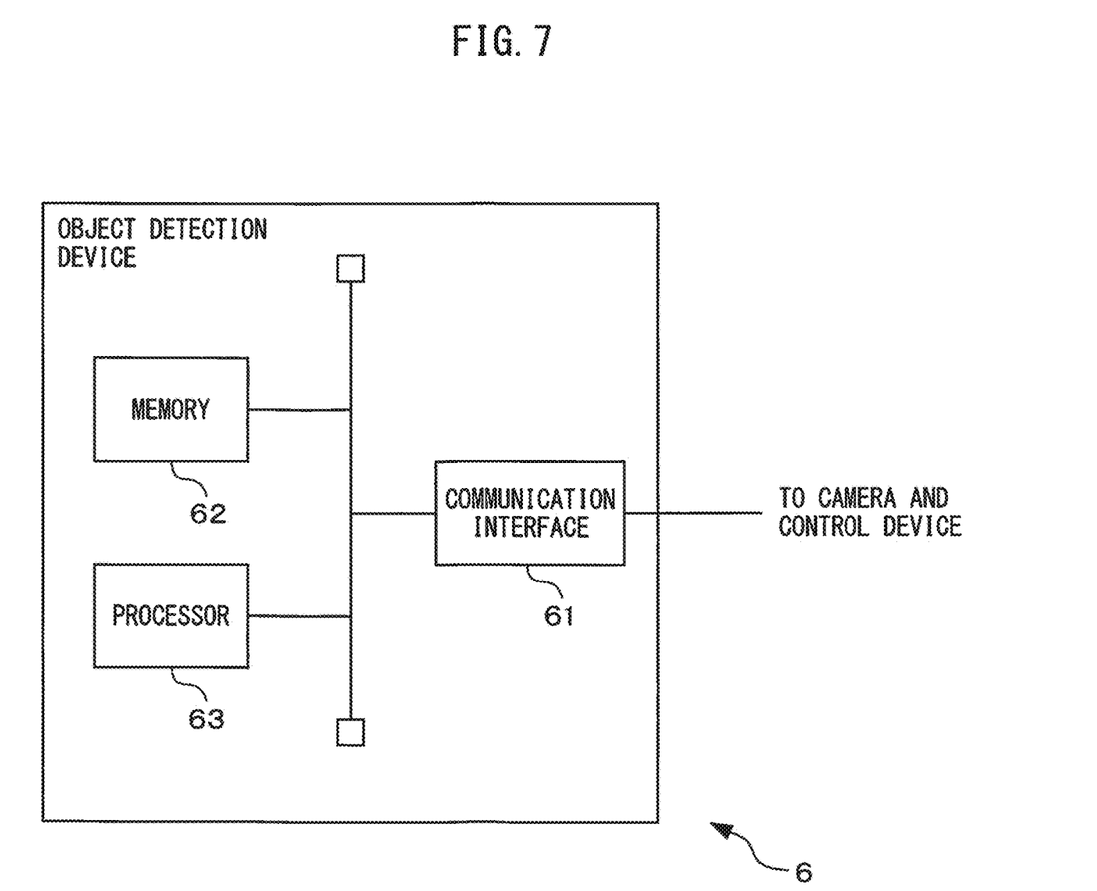
FIG. 7 is a schematic configuration diagram of an object detection device.

FIG. 7 is a schematic configuration diagram of the object detection device 6. The object detection device 6 includes a communication interface 61, a memory 62, and a processor 63. Furthermore, the object detection device 6 may include a user interface (not illustrated) such as a touch panel.

The communication interface 61 includes, for example, a communication interface for connecting the object detection device 6 to the communication line 7 and the communication line 8, a circuit for executing processing related to transmission and reception of a signal via the communication line 7 and the communication line 8, and the like. Then, for example, the communication interface 61 receives an image from the camera 4 via the communication line 7, and passes the received image to the processor 63. Further, the communication interface 61 receives, from the control device 3, information indicating a position and an orientation of the camera 4 determined on the basis of an absolute position of each movable member at the time of generation of each image, and passes the received information to the processor 63. Furthermore, the communication interface 61 receives information indicating a detected position and a detected posture of the workpiece 10 from the processor 63, and outputs the received information to the control device 3 via the communication line 8.

The memory 62 is another example of a storage unit, and includes, for example, a readable-writable semiconductor memory and a read-only semiconductor memory. Furthermore, the memory 62 may include a storage medium such as a semiconductor memory card, a hard disk, or an optical storage medium, and a device that accesses the storage medium.

The memory 62 stores various pieces of information used in object detection processing performed by the processor 63 of the object detection device 6, such as a parameter set that defines a classifier, a template used for detecting the workpiece 10, a camera parameter, and an image received from the camera 4, for example. Furthermore, the memory 62 stores information indicating a position and a posture of the workpiece 10 detected as a result of the object detection processing.

The processor 63 is one example of a control unit, and includes, for example, a central processing unit (CPU) and a peripheral circuit of the CPU. Furthermore, the processor 63 may include a processor for a arithmetic operation. Then, the processor 63 executes the object detection processing. In other words, every time the processor 63 receives an image from the camera 4, the processor 63 may execute processing of the robust detection unit 41, the precision detection unit 42, and the determination unit 43 among the units of the processor 34 of the control device 3 illustrated in FIG. 3. Then, the processor 63 outputs information indicating a detected position and a detected posture of the workpiece 10 to the control device 3 via the communication interface 61 and the communication line 8. Note that the processor 63 may include information indicating a determination result whether or not the camera 4 and the workpiece 10 satisfy a predetermined positional relationship in the information indicating the detected position and the detected posture of the workpiece 10. The processor 34 of the control device 3 may execute processing of the approach control unit 44 and the work control unit 45, on the basis of the received position and the received posture of the workpiece 10.

According to the modified example, the object detection processing and the control of the robot are executed by separate devices, and thus an arithmetic load on the processor of the control device of the robot is reduced.

A robust detection unit 41 of the processor 63 may only detect a position of the workpiece 10 on each image received from the camera 4 or a position and a posture of the workpiece 10 on each image, and may not detect a position and a posture of the workpiece 10 in a real space. Similarly, a precision detection unit 42 of the processor 63 may only detect a position of the workpiece 10 on each image received from the camera 4 or a position and a posture of the workpiece 10 on each image, and may not detect a position and a posture of the workpiece 10 in the real space. In this case, the processor 63 may output the position and the posture of the workpiece 10 on the image to the control device 3 via the communication interface 61 and the communication line 8. Then, the processor 34 of the control device 3 may execute processing of detecting the position and the posture of the workpiece 10 in the real space, on the basis of the position and the posture of the workpiece 10 on the image in the robust detection unit 41 and the precision detection unit 42.

According to still another modified example, a plurality of servers in which the camera 4 and the control device 3 are communicably connected to each other may execute the object detection processing. In this case, for example, any one of the plurality of servers may execute the processing of the robust detection unit 41, another one of the plurality of servers may execute the processing of the precision detection unit 42, and still another one of the plurality of servers may execute the processing of the determination unit 43.

Further, a computer program for executing processing of each unit of the processor 34 of the control device 3 may be provided in form of being recorded in a computer-readable portable recording medium, such as a semiconductor memory, a magnetic recording medium, or an optical recording medium.

All examples and conditional language recited herein are intended to have teaching purpose to aid the reader in understanding the concepts contributed by the inventor to the present invention and furthering the art, and are to be construed as being without limitation to such specifically recited examples and conditions nor does the organization of such examples in the specification related to showing of the superiority and inferiority of the invention. Although the embodiment of the present invention is described in detail, it is to be understood that various changes, substitutions, and modifications can be made hereto without departing from the spirit and scope of the invention.

What is claimed is:
1. An object detection device, comprising:
 a memory configured to store a template representing a feature of an appearance of a target object when the target object is viewed from a predetermined direction; and
 a processor configured to
  detect, when a camera that captures the target object and generates an image representing the target object and the target object do not satisfy a predetermined positional relationship, a position of the target object on the image by inputting the image to a classifier being previously trained in such a way as to detect the target object from the image; and detect, when the camera and the target object satisfy the predetermined positional relationship, a position of the target object on the image by comparing the image with the template.

2. The object detection device according to claim 1, wherein
the processor is further configured to detect, when the position of the target object on the image is detected by using the classifier, a position of the target object in a real space, based on the position of the target object on the image detected by using the classifier, and detect, when the position of the target object on the image is detected by using the template, a position of the target object in a real space, based on the position of the target object on the image detected by using the template.

3. The object detection device according to claim 2, wherein
the processor detects a position and a posture of the target object on the image in accordance with a relative positional relationship of the template with respect to the image when the image and the template coincide with each other the most, and detects a position and a posture of the target object in a real space, based on the position and the posture of the target object on the image.

4. The object detection device according to claim 2, wherein
the classifier is further trained in such a way as to detect a posture of the target object represented on the image, and the processor detects a position and a posture of the target object on the image by inputting the image to the classifier, and detects a position and a posture of the target object in a real space, based on the position and the posture of the target object on the image.

5. The object detection device according to claim 2, wherein the processor is further configured to
determine whether or not the camera and the target object satisfy the predetermined positional relationship based on a position in the real space of the target object and a position of the camera, detect a position of the target object on the image by using the classifier when the camera and the target object do not satisfy the predetermined positional relationship, and on the other hand, detect a position of the target object on the image by using the template when the camera and the target object satisfy the predetermined positional relationship.

6. A control device of an automatic machine including at least one movable member, the control device comprising:
a memory configured to store a template representing a feature of an appearance of a target object as a work target of the automatic machine when the target object is viewed from a predetermined direction; and
a processor configured to
when a camera that is attached to the movable member, captures the target object, and generates an image representing the target object and the target object do not satisfy a predetermined positional relationship, detect a position of the target object on the image by inputting the image to a classifier being previously trained in such a way as to detect the target object from the image, and detect a position of the target object in a real space, based on the position of the target object on the image;

when the camera and the target object satisfy the predetermined positional relationship, detect a position of the target object on the image by comparing the image with the template, detects a position of the target object in a real space, based on the position of the target object on the image, or detect a position of the target object in a real space, based on positional information which indicates a relative position with respect to the target object and is acquired by a sensor that acquires the positional information;

control the movable member in such a way that the camera and the target object satisfy the predetermined positional relationship, based on the position of the target object in a real space detected by using the classifier, when the camera and the target object do not satisfy the predetermined positional relationship; and control the movable member in such a way as to move the movable member to a position in which the automatic machine can perform predetermined work on the target object, based on the position of the target object in a real space detected by using the template, when the camera and the target object satisfy the predetermined positional relationship.

7. The control device according to claim 6, wherein
the predetermined positional relationship is set that a distance between the camera and the target object is equal to or less than a predetermined distance.

8. The control device according to claim 6, wherein
the predetermined positional relationship is set that a distance between the camera and the target object is equal to or less than a predetermined distance, and the target object takes a predetermined posture with respect to the camera, the classifier is further trained in such a way as to detect a posture of the target object represented on the image, and the processor detects a position and a posture of the target object on the image by inputting the image to the classifier when the camera and the target object do not satisfy the predetermined positional relationship, and detects a position and a posture of the target object in a real space, based on the position and the posture of the target object on the image, and control the movable member in such a way that a distance between the camera and the target object is equal to or less than the predetermined distance, and the target object takes the predetermined posture with respect to the camera, based on the position and the posture of the target object in a real space detected by using the classifier.

9. A non-transitory recording medium that stores an object detection computer program for causing a computer to execute:
detecting, when a camera that captures a target object and generates an image representing the target object and the target object do not satisfy a predetermined positional relationship, a position of the target object on the image by inputting the image to a classifier being previously learned in such a way as to detect the target object from the image; and detecting, when the camera and the target object satisfy the predetermined positional relationship, a position of the target object on the image by comparing, with the image, a template representing a feature of an appearance of the target object when the target object is viewed from a predetermined direction.

* * * * *